US012540594B1

(12) United States Patent
Merchant

(10) Patent No.: US 12,540,594 B1
(45) Date of Patent: Feb. 3, 2026

(54) FUEL INJECTOR ADAPTER

(71) Applicant: Caterpillar Inc., Peoria, IL (US)

(72) Inventor: Jack Albert Merchant, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/969,547

(22) Filed: Dec. 5, 2024

(51) Int. Cl.
*F02M 61/14* (2006.01)

(52) U.S. Cl.
CPC .................................... *F02M 61/14* (2013.01)

(58) Field of Classification Search
CPC .. F02M 61/14; F02M 21/0281; F02M 61/168; F02B 3/06
USPC ........................................................ 123/470
See application file for complete search history.

(56) References Cited

U.S. PATENT DOCUMENTS 5,713,336 A * 2/1998 King .................. F02D 19/0642 123/575
6,959,878 B1 11/2005 O'Brien et al.
8,997,715 B2 4/2015 Worthington et al.
10,428,780 B2 10/2019 Eves
2013/0112171 A1* 5/2013 Matsukawa ............ F02M 43/00 123/456
2023/0141758 A1* 5/2023 Del Rossa .............. B25B 27/02 29/426.5

FOREIGN PATENT DOCUMENTS

IN 201941039411 A 4/2021
IN 202141034097 A 2/2023

* cited by examiner

*Primary Examiner* — Hung Q Nguyen
*Assistant Examiner* — James J Kim
(74) *Attorney, Agent, or Firm* — von Briesen & Roper, s.c.

(57) ABSTRACT

A fuel injector adapter for an internal combustion engine, including an adapter shaft including a first shaft end disposed within a fuel injector, a second shaft end, a shaft passage disposed in the adapter shaft extending from the first shaft end to a port portion of the adapter shaft, the port portion including annular openings; and an adapter body disposed over the adapter shaft, including a fitting portion including a first end, a second end, and a bore including a fuel portion, an elbow port spaced from the fitting portion, the elbow port including a port fuel portion, and an extension connecting the fitting portion to the elbow port, the extension including a fuel passage for connecting the port fuel portion of the elbow port to the fuel portion of the bore proximate the annular openings of the port portion of the adapter shaft.

20 Claims, 8 Drawing Sheets

FUEL INJECTOR ADAPTER

TECHNICAL FIELD

The present disclosure generally relates to internal combustion engines, and more particularly relates to fuel injection systems within internal combustion engines.

BACKGROUND

The field of internal combustion engines has seen continuous innovation aimed at improving efficiency, reducing emissions, and enhancing safety. Diesel engines, in particular, are widely utilized in a variety of applications, including transportation, power generation, and industrial machinery, due to their high thermal efficiency and durability. However, traditional diesel engines typically rely on conventional high-flashpoint diesel fuel, which, while effective, presents several limitations, particularly in applications that demand enhanced safety protocols.

Recent advancements have explored the use of alternative low-flashpoint fuels, such as liquefied natural gas (LNG), methanol, and ethanol, as potential substitutes for conventional diesel fuel. These low-flashpoint fuels offer benefits in terms of emissions reduction and fuel availability but also introduce significant challenges. Specifically, the lower flashpoint of these fuels increases the risk of unintentional ignition and poses hazards in the event of fuel leaks or system malfunctions. Therefore, when utilizing low-flashpoint fuels, it becomes critical to implement specialized engine configurations that minimize ignition risks and ensure safe operation, particularly in sensitive environments such as marine vessels, mining equipment, and densely populated areas.

The concept of "inherently safe" engine designs has gained traction as a solution to address these safety challenges. An inherently safe engine configuration aims to prevent conditions that could lead to uncontrolled combustion or ignition of low-flashpoint fuels. These designs typically involve modifications to the fuel injection system, combustion chamber, and exhaust gas handling to ensure that even in the event of a malfunction, the engine remains within safe operating parameters. In addition, inherently safe engine configuration do not require hazard zone protected engine chambers or rooms.

Various approaches have been proposed to improve the safety of engines operating on low-flashpoint fuels. Particularly, systems have been developed to monitor the primary seals of the fuel injectors of these engines utilizing leak detection. For example, U.S. Pat. Nos. 8,997,715 and 10,428,780 disclose examples of such systems. However, these publications do not recognize a fuel injection system with the construction and other benefits in the manner disclosed herein.

In light of the aforementioned shortcomings, there remains a need for engine configurations that can reliably and safely deliver fuel and monitor leaks directly at the fuel injector. There also remains a need for a fuel injector configuration with leak monitoring that allows for servicing other components of the engine without disconnecting fuel injection components.

SUMMARY OF THE DISCLOSURE

In accordance with one aspect of the disclosure, a fuel injector adapter for an internal combustion engine may be provided. The fuel injector adapter may comprise an adapter shaft including a first shaft end disposed within a fuel injector, a second shaft end, and a shaft passage disposed in the adapter shaft extending from the first shaft end to a port portion of the adapter shaft. The port portion may include annular openings. The fuel injector adapter may comprise an adapter body disposed over the adapter shaft, including a fitting portion including a first end, a second end, and a bore including a fuel portion. The adapter body may comprise an elbow port spaced from the fitting portion, the elbow port including a port fuel portion. The adapter body may comprise an extension connecting the fitting portion to the elbow port, the extension including a fuel passage for connecting the port fuel portion of the elbow port to the fuel portion of the bore proximate the annular openings of the port portion of the adapter shaft.

In accordance with another aspect of the present disclosure, a method of assembling an internal combustion engine may be provided. The method may comprise providing a fuel injector disposed in a rocker base on the internal combustion engine. The method may comprise attaching an adapter shaft of a fuel injector adapter to the fuel injector, the adapter shaft including a first end disposed within the fuel injector, a second shaft end, a shaft passage disposed in the adapter shaft extending from the first shaft end to a port portion of the adapter shaft. The method may comprise disposing a fitting portion of an adapter body about the adapter shaft, the adapter body including the fitting portion with a first end and a second end, a bore including a fuel portion, an elbow port including a port fuel portion; and an extension connecting the fitting portion to the elbow port including a fuel passage for connecting the port fuel portion of the elbow port to the fuel portion of the bore proximate the port portion of the adapter shaft. The method may comprise connecting an elbow to the adapter body, the elbow including an elbow body with a connector end disposed within an elbow port of the adapter body and a bulkhead end attached to a bulkhead on the rocker base.

In accordance with yet another aspect of the present disclosure, an internal combustion engine may be provided. The internal combustion engine may comprise a rocker base, a fuel injector attached to the rocker base, and a fuel injector adapter connecting to the fuel injector. The fuel injector adapter may comprise an adapter shaft including a first shaft end disposed within a fuel injector, a second shaft end, a shaft passage disposed in the adapter shaft extending from the first shaft end to a port portion of the adapter shaft, the port portion including annular openings. The fuel injector adapter may comprise an adapter body disposed over the adapter shaft, including a fitting portion including a first end, a second end, and a bore including a fuel portion and a monitoring portion. The adapter body may include an elbow port spaced from the fitting portion, the elbow port including a port fuel portion and a port monitoring portion. The fuel injector adapter may comprise an extension connecting the fitting portion to the elbow port. The extension may include a fuel passage for connecting the port fuel portion of the elbow port to the fuel portion of the bore proximate the annular openings of the port portion of the adapter shaft. The extension may include a monitoring passage for connecting the port monitoring portion of the elbow port to the monitoring portion of the bore. The internal combustion engine may comprise an elbow connecting the fuel injector adapter to the rocker base.

These and other aspects and features of the present disclosure will be more readily understood when read in conjunction with the accompanying drawings.

DETAILED DESCRIPTION

Figure 1:
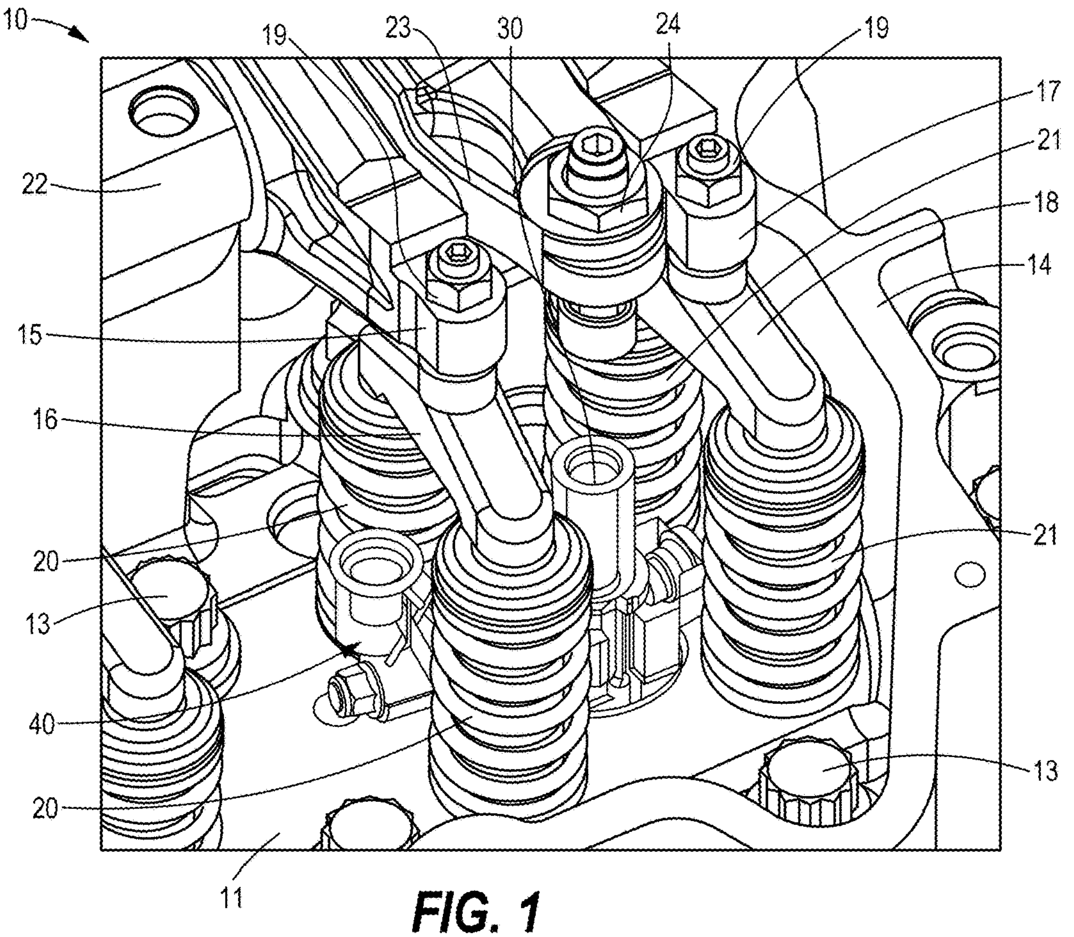
FIG. 1 is a perspective view of an internal combustion engine constructed in accordance with an embodiment of the present disclosure.

Referring now to the drawings, and with specific reference to FIG. 1, an internal combustion engine is depicted and generally referred to using reference numeral 10. The internal combustion engine ("engine 10") is exemplarily embodied as a diesel engine. While engine 10 is depicted as such, it should be noted that a type of engine use is merely exemplary and illustrative in nature. It will be acknowledged that the teachings of the present disclosure can be similarly applied to other internal combustion engines, including but not limited to petrol engines, alternative fuel engines, and other engines utilizing combustible fuels as known to persons skilled in the art.

Internal combustion engines may be used to convert combustion energy into rotational mechanical energy. The engine 10 may comprise a head 11 assembled onto a block (not depicted) housing a cylinder with a piston connected to a rotating crankshaft. The head 11 may be attached to the block by head bolts 13 placed through attachment holes 12. The engine 10 may provide a combustible fuel to the cylinder such that when ignited, the energy produced forces the piston in a downward direction, thereby causing a rotation in the crankshaft. The combustible fuel may be conventional diesel fuel, petrol, or may be a low-flashpoint fuel such as liquefied natural gas (LNG), methanol, ethanol, or any fuel as known. Various internal combustion engines may have configurations utilizing any number of cylinders and pistons contained within the block. As such, engine 10 may include a single cylinder, or may include a plurality of cylinders.

Figure 2:
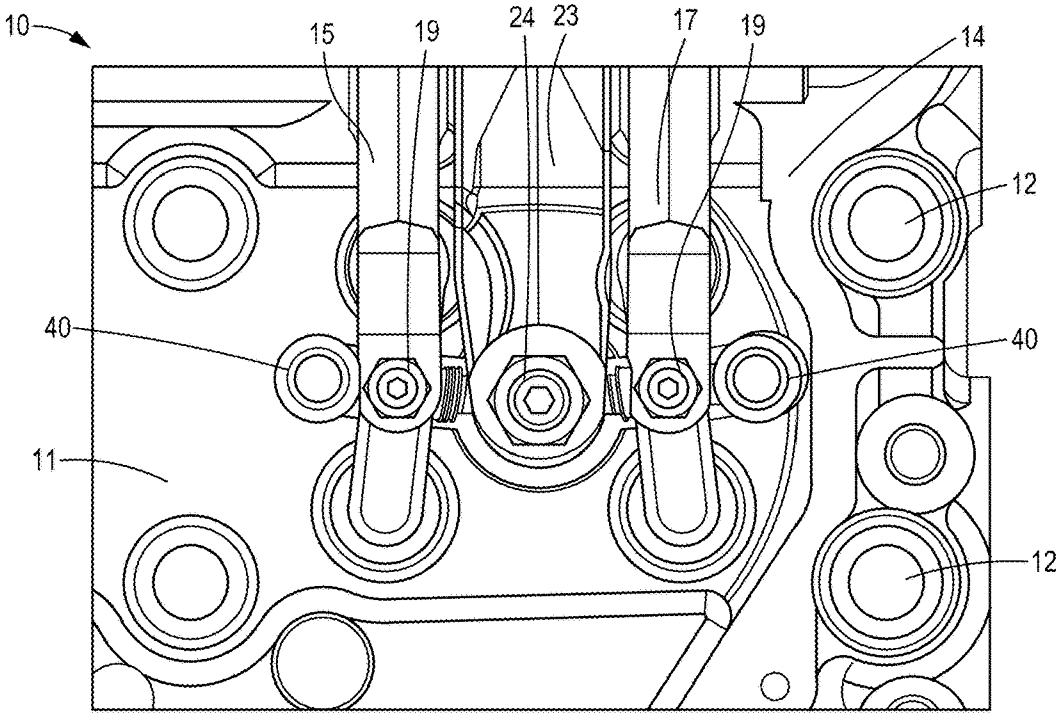
FIG. 2 is a top view of an internal combustion engine constructed in accordance with an embodiment of the present disclosure.

Internal combustion engines utilize combustion of a mixture of fuel and air. In order for air to enter and exit the cylinder of the internal combustion engine, the engine 10 may include a camshaft (not depicted) coupled to the crankshaft. The camshaft may be connected to a valvetrain as depicted in FIGS. 1-2. The head 11 may include openings into the cylinder that are controlled by valves 20. Lobes on the camshaft may be connected to and actuate an intake rocker arm 15 and an exhaust rocker arm 17, which rotate about a rocker shaft 22. The intake rocker arm 15 may actuate an intake connector 16, which presses against a first set of the valves 20, which are each biased in a closed position by a valve spring 21. Similarly, the exhaust rocker arm 17 may actuate an exhaust connector 18, which presses against a second set of the valves 20, which are also biased in a closed position by the valve spring 21. The valves 20 that correspond to the intake control the intake of air into the cylinder prior to combustion, and the valves 20 that correspond to the exhaust control the exhaust of gasses derived from the combustion process out of the cylinder. The intake rocker arm 15 and the exhaust rocker arm 17 may be held in a predetermined position relative to the intake connector 16 and the exhaust connector 18 by a lash nut 19.

The engine 10 may comprise a rocker base 14 configured to be attached to the head 11 of the engine 10, including a bulkhead 60 with a bulkhead fuel passage 62 and a bulkhead monitoring passage 63 (FIG. 9), each extending from an outside surface of the rocker base 14 to an inside surface of the rocker base 14. The engine 10 may comprise a fuel injector 30 attached to the rocker base 14 and configured to deliver fuel to the cylinder of the internal combustion engine. The fuel injector 30 may be actuated by an injector arm 23 also rotating about the rocker shaft 22, and held in place by a lock nut 24. The fuel injector 30 may also be electronically actuated by a controller connected to the engine 10, as known by persons skilled in the art.

The engine 10 may comprise a fuel injector adapter 40 configured to connect to the fuel injector 30. The fuel injector adapter 40 is configured to be the primary means of delivering fuel to the fuel injector 30 such that it may be atomized within the cylinder of the engine 10 and combusted. The fuel injector adapter 40 is advantageously configured to be placed below certain components of the valvetrain. As depicted in FIGS. 1-2, the intake rocker arm 15 and the exhaust rocker arm 17 extend over the fuel injector adapter 40. As such, components of the valvetrain may be serviced by opening a rocker cover (not depicted), and may be removed, replaced, and adjusted without requiring a need to disconnect fuel delivery components or lines.

Figure 3:
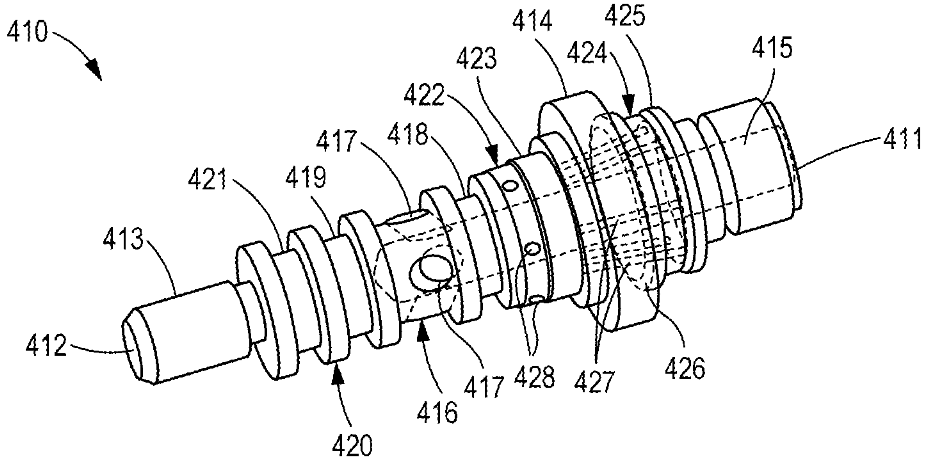
FIG. 3 is a perspective view of an adapter shaft of a fuel injector adapter constructed in accordance with an embodiment of the present disclosure.
Figure 4:
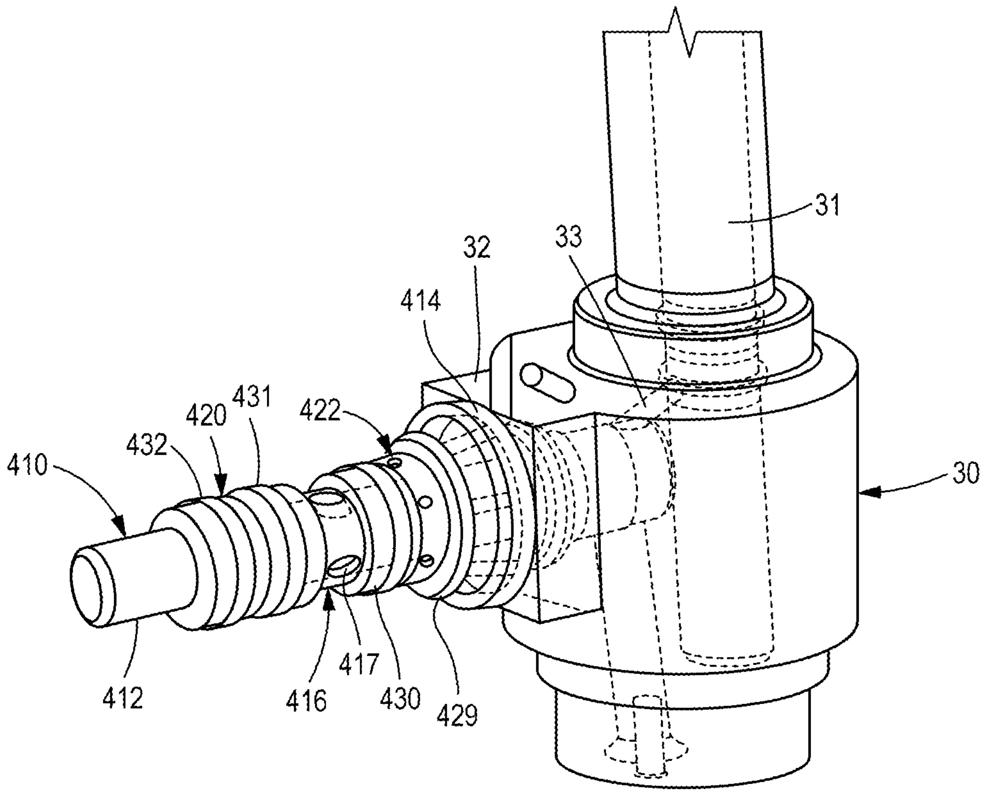
FIG. 4 is a perspective view of an adapter shaft of a fuel injector adapter connected to a fuel injector constructed in accordance with an embodiment of the present disclosure.
Figure 5:
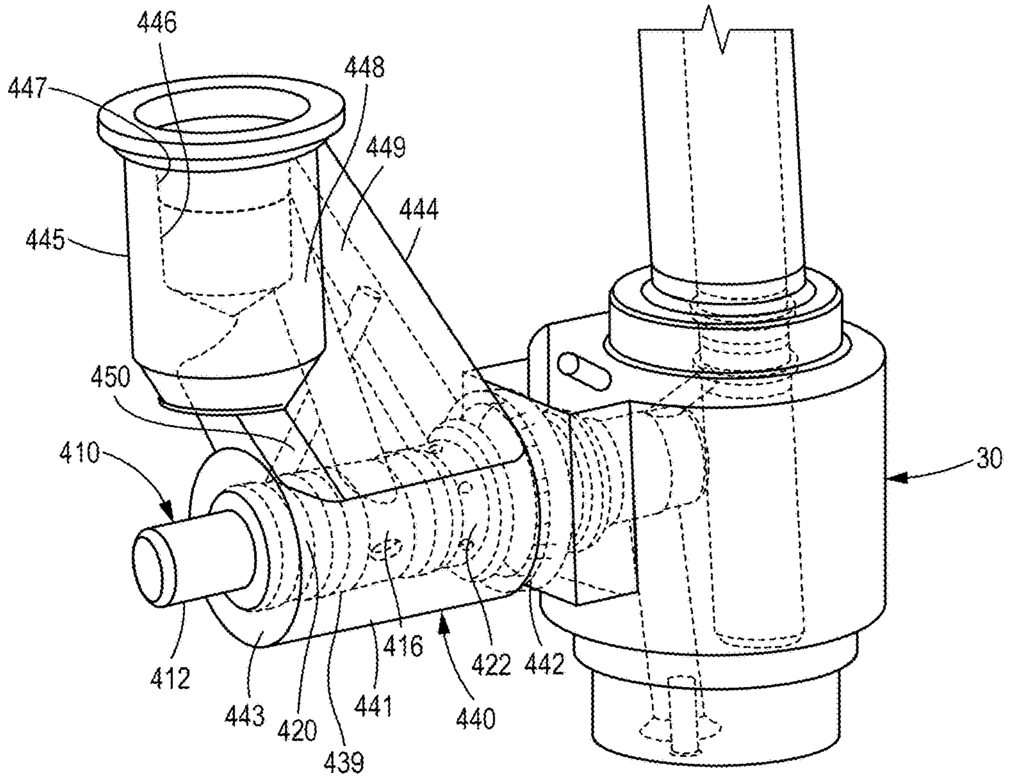
FIG. 5 is a perspective view of a fuel injector adapter connected to a fuel injector constructed in accordance with an embodiment of the present disclosure.

As depicted in FIGS. 3-4, the fuel injector adapter 40 may further comprise an adapter shaft 410 including a first shaft end 411 configured to be disposed within the fuel injector 30, a second shaft end 412, a shaft passage 415 disposed in the adapter shaft 410 extending from the first shaft end 411 to a port portion 416 of the adapter shaft 410, the port portion 416 including annular openings 417. The adapter shaft 410 may also include a shoulder 414 for spacing the first shaft end 411 a specific distance within the fuel injector 30. As depicted in FIGS. 5-8, the fuel injector adapter 40 may further comprise an adapter body 440 disposed over the adapter shaft 410. The adapter body 440 may include a fitting portion 441 including a first end 442, a second end 443, and a bore 439 including a fuel portion 438. The adapter body 440 may include an elbow port 445 spaced from the fitting portion 441, the elbow port 445 including a port fuel portion 446, and an extension 444 connecting the fitting portion 441 to the elbow port 445, the extension 444 including a fuel passage 448 for connecting the port fuel portion 446 of the elbow port 445 to the fuel portion 438 of the bore 439 proximate the annular openings 417 of the port portion 416 of the adapter shaft 410.

FIG. 3 depicts the adapter shaft 410 in perspective view with internal passages shown with hidden lines. The adapter shaft 410 may further comprise a plurality of annular recesses (418, 419, 421, 423) on an outside surface of the adapter shaft 410. As shown depicted in FIG. 4, a first plurality of seals (429, 430, 431, 432) may be disposed within the plurality of annular recesses of the adapter shaft 410. In this manner, spacing of the first plurality of seals on the adapter shaft 410 separates the bore 439 to further include a monitoring portion when the adapter body 440 is disposed over the adapter shaft 410. In addition, the elbow port 445 may include a port monitoring portion 447, and the extension 444 may include a monitoring passage 449 for connecting the port monitoring portion 447 to the monitoring portion.

As depicted in the primary embodiment, particularly in FIGS. 3-7, the monitoring portion may further include a first monitoring portion 424 proximate the first shaft end 411 of the adapter shaft 410 when it is disposed within the fuel injector 30. The first plurality of seals may include a first pair of O-rings 425, 426 defining a boundary of the first monitoring portion 424. The monitoring portion may further include a second monitoring portion 422 between the first shaft end 411 and the port portion 416 of the adapter shaft 410. The first plurality of seals may also include a second pair of O-rings 429, 430 defining a boundary of the second monitoring portion 422.

Figure 7:
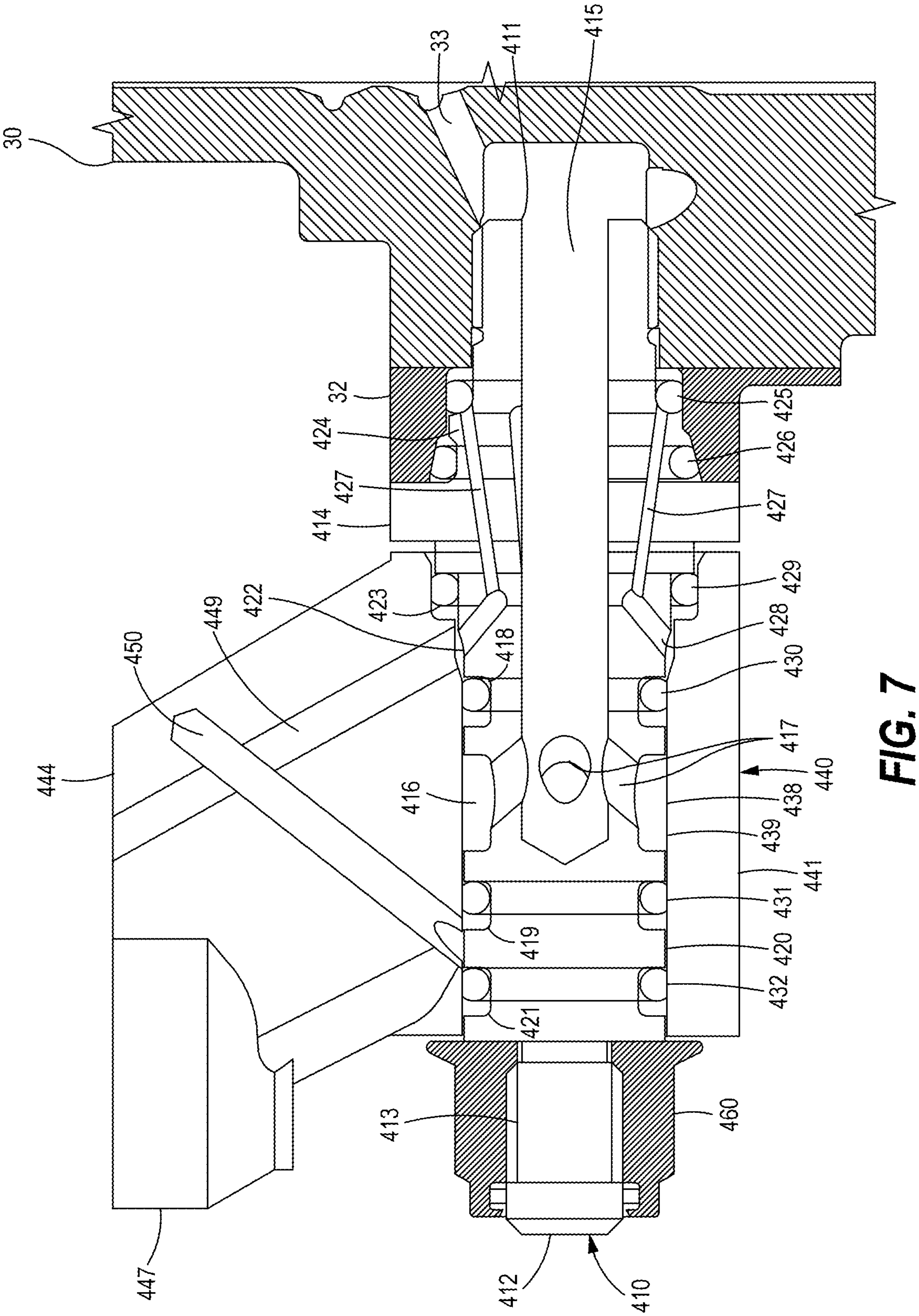
FIG. 7 is a cross-section view of a fuel injector adapter connected to a fuel injector constructed in accordance with an embodiment of the present disclosure.

As depicted in FIG. 7, the first monitoring portion 424 and the second monitoring portion 422 may both be fluidly connected to the monitoring passage 449. The second monitoring portion 422 may include a connection passage 427, placing the first monitoring portion 424 and the second monitoring portion 422 in fluid communication. The second monitoring portion 422 may include ports 428 proximate where the monitoring passage 449 exits into the bore 439. In this manner, any fuel that leaks past the first pair of O-rings 425, 426, where the adapter shaft 410 connects to the fuel injector 30 may be collected and distributed to the monitoring passage 449. Simultaneously, any fuel that leaks past the second pair of O-rings 429, 430 may also be collected and distributed to the monitoring passage 449.

In the embodiment of FIGS. 3-7, the monitoring portion may include a third monitoring portion 420. The third monitoring portion 420 may be fluidly connected to a bridge passage 450, which may connect to the monitoring passage 449 within the extension 444. In order to define the third monitoring portion 420, the first plurality of seals may further include a third pair of O-rings 431, 432. The second monitoring portion 422 and the third monitoring portion 420 may both be necessary to effectively monitor fuel leaks at either side of the port portion 416 of the fuel injector adapter 40.

Figure 6:
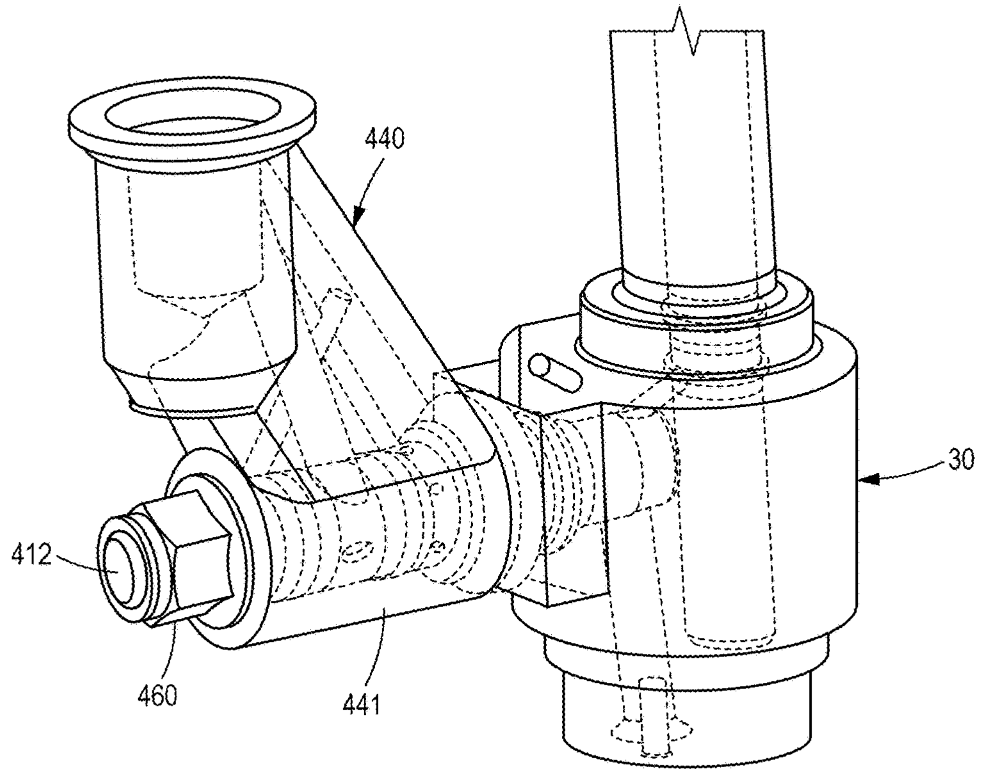
FIG. 6 is a perspective view of a fuel injector adapter connected to a fuel injector constructed in accordance with an embodiment of the present disclosure.

As depicted in FIGS. 6-7, the fuel injector adapter 40 may be locked into position against the fuel injector 30. The first shaft end 411 and the second shaft end 412 of the adapter shaft 410 may each be threaded such that the adapter shaft 410 may firstly be threaded into the fuel injector 30. The adapter body 440 may then be disposed over the adapter shaft 410 as described. The fuel injector adapter 40 may further comprise a fastener 460 disposed on the second shaft end 412 configured to lock the adapter body 440 in an abutting position with the fuel injector 30. The fastener 460 may be threaded onto the second shaft end 412 of the adapter shaft 410 via threads 413, thereby locking the fuel injector adapter 40 in a fixed position.

Figure 8:
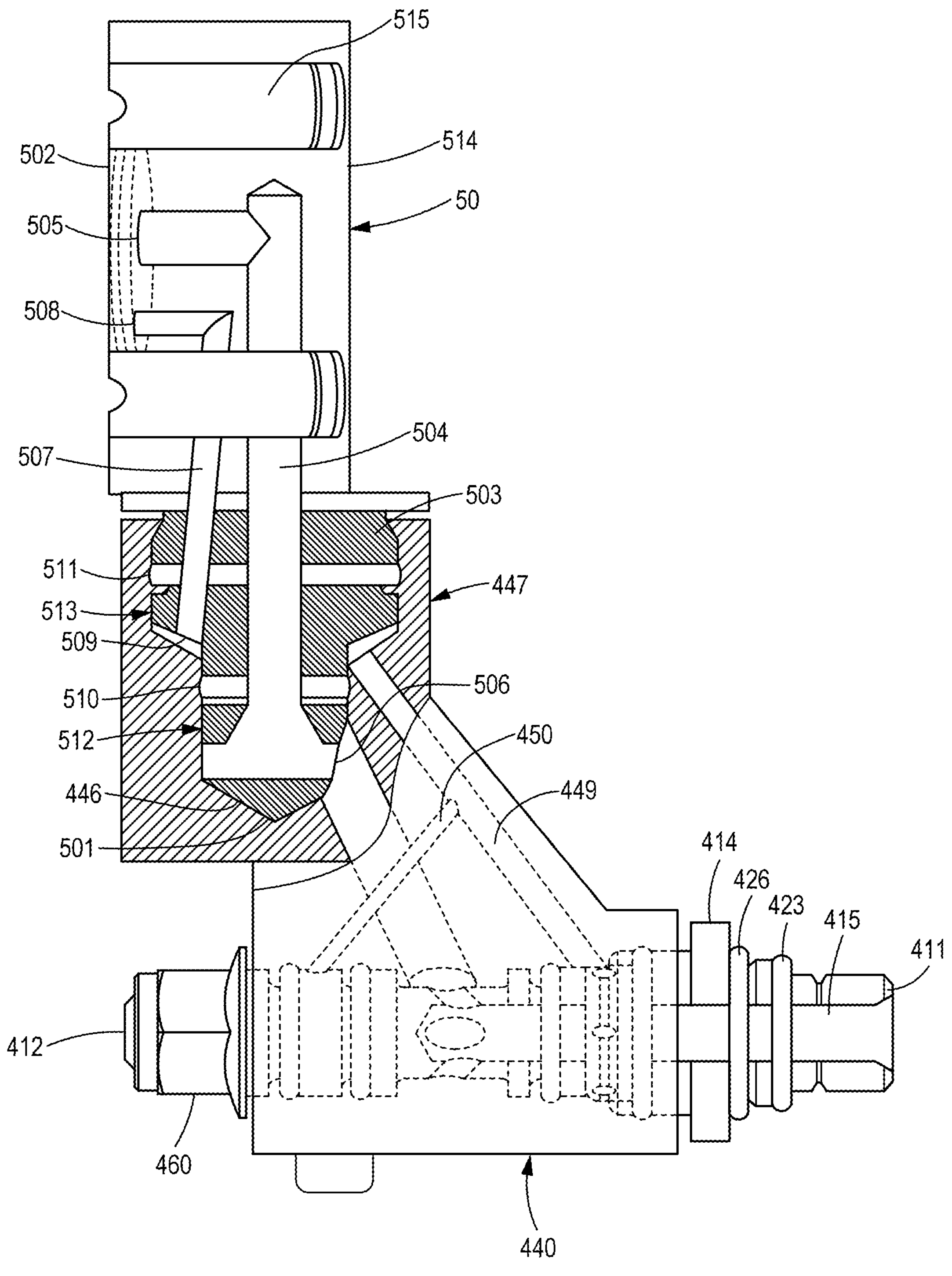
FIG. 8 is a cross-section view of a fuel injector adapter and elbow constructed in accordance with an embodiment of the present disclosure.

The fuel injector adapter 40 may further comprise an elbow 50 configured to connect the fuel injector adapter 40 to the bulkhead 60 of the rocker base 14. FIG. 8 depicts a cross-section view of the elbow 50 attached to the fuel injector adapter 40. The elbow 50 may further comprise an elbow body 514 including a connector end 501 configured to be disposed within the elbow port 445 of the fuel injector adapter 40, and a bulkhead end 502 configured to be attached to the bulkhead 60. The elbow 50 may further comprise an elbow fuel passage 504 within the elbow body 514 extending from an elbow fuel portion 506 at the connector end 501 to the bulkhead end 502 and aligning at an elbow fuel inlet portion 505 with a bulkhead fuel passage 62 in the bulkhead 60. The elbow 50 may further comprise an elbow monitoring passage 507 within the elbow body 514 extending from an elbow monitoring portion 509 at the connector end 501 to the bulkhead end 502 and aligning at an elbow inlet monitoring portion 508 with a bulkhead monitoring passage 63 in the bulkhead 60. The elbow 50 may also comprise a second plurality of seals 510, 511 disposed about the connector end 501 such that the elbow fuel passage 504 and the elbow monitoring passage 507 are fluidly separated at the connector end 501 when the elbow 50 is inserted into the elbow port 445. The second plurality of seals 510, 511 separates the elbow fuel passage 504 and the elbow monitoring passage 507 such that the elbow fuel portion 506 aligns with the port fuel portion 446, and the elbow monitoring portion 509 aligns with the port monitoring portion 447.

Figure 9:
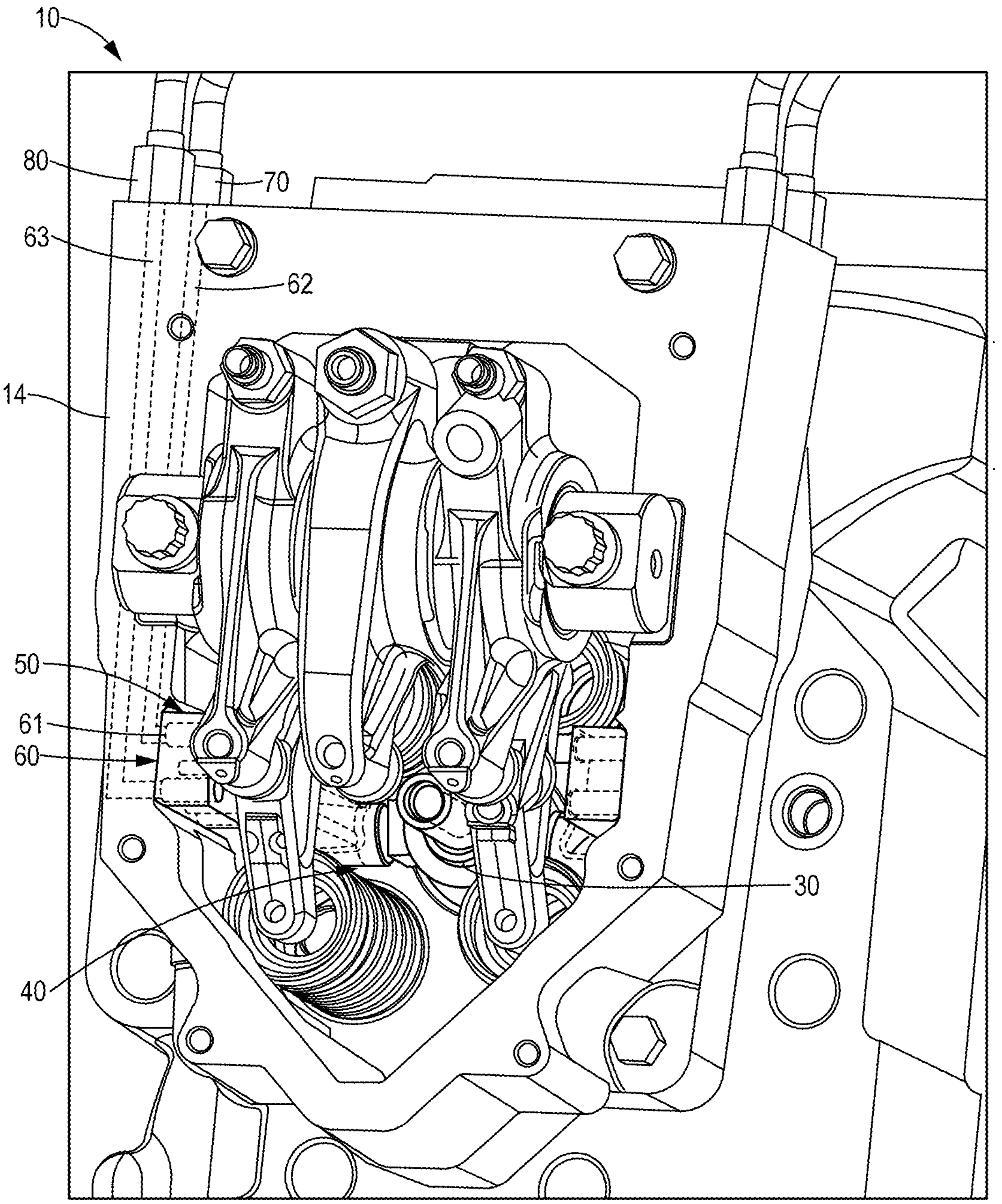
FIG. 9 is a perspective view of a fuel injector adapter and elbow constructed in accordance with an embodiment of the present disclosure.

By providing the elbow 50 connected to the bulkhead 60, both a fuel line 70 and a monitoring line 80 may be connected to the bulkhead 60 such that fuel is delivered via the bulkhead fuel passage 62 to the fuel injector 30, and possible fuel leaks may be detected in the fuel injector adapter 40 by delivering leaking fuel through the bulkhead monitoring passage 63. As depicted in FIG. 9, the elbow 50 may be securely attached to the bulkhead 60 on the inside surface of the rocker base 14 through the use of fasteners 61. However, any other secure fastening means may also be utilized. The fuel line 70 and the monitoring line 80 may be connected to the bulkhead 60 of the rocker base 14 on the outside surface of the rocker base 14.

As depicted in FIG. 9, the fuel line 70 and the monitoring line 80 are attached to the rocker base 14 at a rear portion. However, this connection point may be made around the periphery of the rocker base 14 at any point as required. The fuel line 70 may be connected to a fuel rail (not depicted), and other fuel systems that may be suitable for delivering fuel through the fuel line 70 at a pressure up to 20 kPa. In other embodiments, the fuel line 70 may be implemented as part of a fuel system configured to deliver fuel at higher pressures. In some embodiments, the fuel line 70 may be configured to deliver fuel at high pressures up to 850 kPa.

Figure 10:
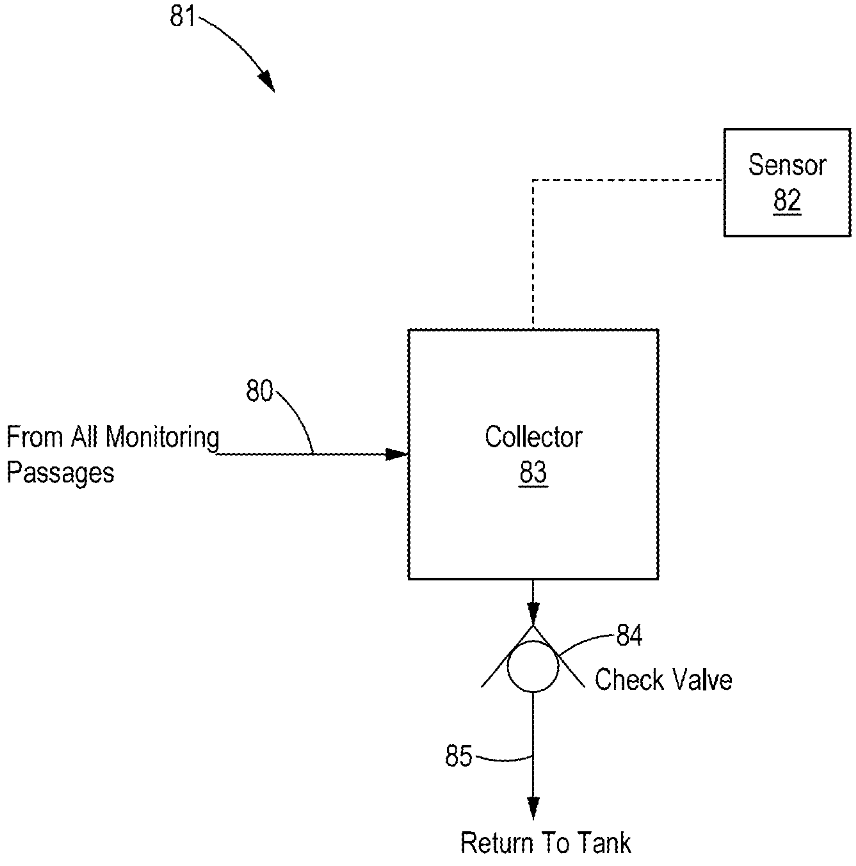
FIG. 10 is a schematic illustration of a leak monitor connected to an internal combustion engine constructed in accordance with an embodiment of the present disclosure.

The engine 10 may further comprise a leak monitor 81 connected to the bulkhead monitoring passage 63 at the outside surface of the rocker base 14. FIG. 10 depicts a schematic illustration of the leak monitor 81 connected via the monitoring line 80. The leak monitor 81 may further comprise a sensor 82 for detecting fuel. In some embodiments, the leak monitor 81 may be configured to provide pressurized air to the monitoring passage 449, and the sensor 82 may be configured to detect atomized fuel within the pressurized air. In other embodiments, the leak monitor 81 may be configured to provide gaseous nitrogen into the monitoring passage 449, and the sensor 82, which may be a pressure sensor, may detect an increase in pressure within the monitoring line 80 due to leaking fuel. Other embodiments of detecting leaking fuel using the leak monitor 81 as known may be utilized. The monitoring line 80 may collect the leaking fuel from, and as such, the leak monitor 81 may also include a collection device 83 connected to the monitoring passage 449 for collecting an excess of leaking fuel. The collection device 83 may return the excess fuel to a fuel tank through a check valve 84 and a return line 85.

INDUSTRIAL APPLICABILITY

In operation, the teachings of the present disclosure can find applicability in many industries including but not limited to marine vessels, mining equipment, on and off-highway vehicles, and other industries utilizing internal combustion engines. While depicted and described in conjunction with an internal combustion engine using low-flashpoint fuels, such teachings can also find applicability with other engines using a wide array of fuels as known to persons skilled in the art.

Figure 11:
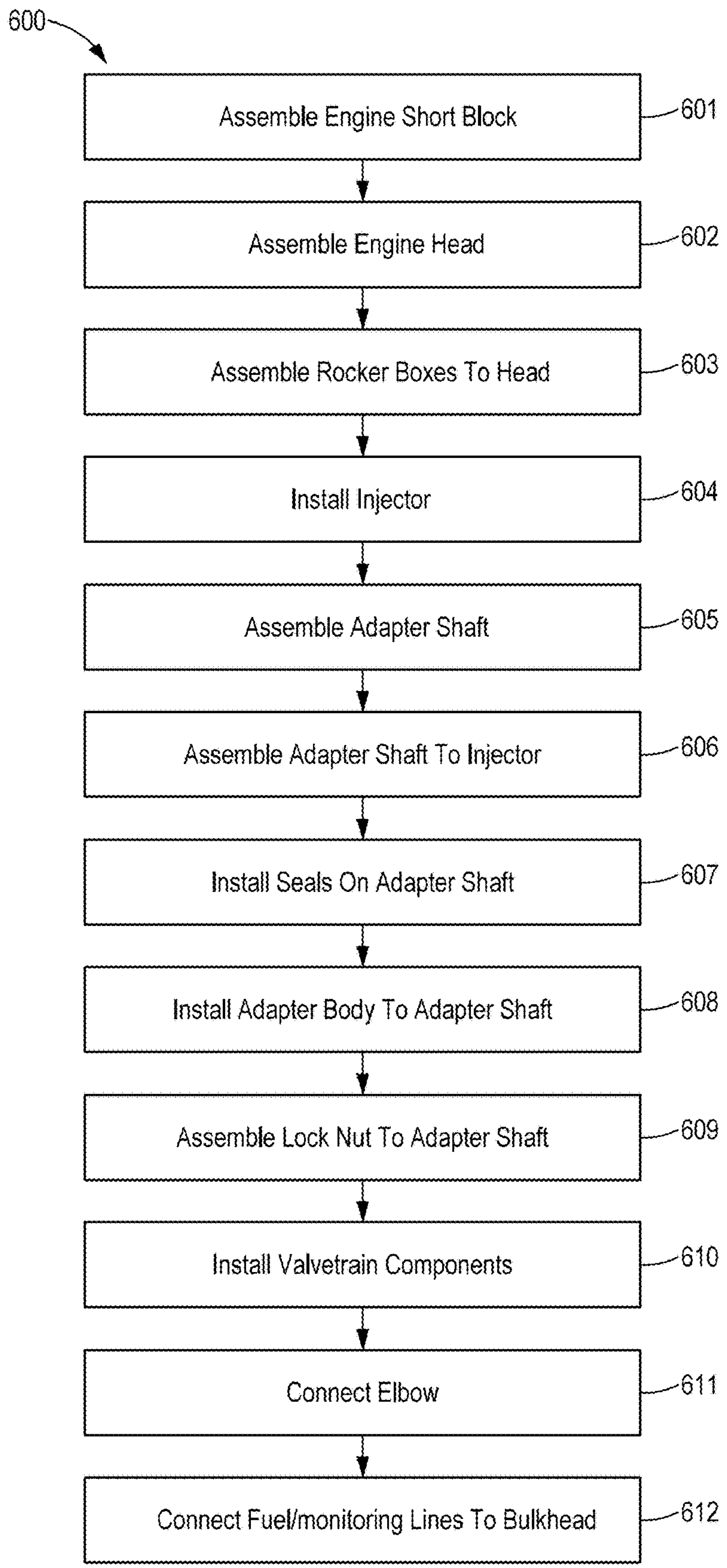
FIG. 11 is a flowchart depicting a sample sequence of steps for assembling an internal combustion engine

FIG. 11 illustrates a visual representation of a method 600 of assembling the engine 10. In a first step 601, a short block of the engine 10 is assembled. The short block may refer to an assembly of the engine 10 including the block, the crankshaft, the piston, and a connecting rod connecting the piston to the crankshaft. In a second step 602, the head 11 is assembled to the engine 10, and in a third step 603, the rocker base 14 is installed on the head 11. The engine 10 may comprise a single cylinder, or may comprise many cylinders arranged in a specific configuration. The head 11 may be a plurality of heads disposed on a number of cylinders, or may be a single head disposed on several cylinders. Similarly, the rocker base 14 may be a single rocker base disposed on a single head covering multiple cylinders, may be a plurality of rocker bases disposed on a single head covering multiple cylinders, or may be a plurality of rocker bases disposed on a corresponding plurality of heads covering a corresponding plurality of cylinders.

In a fourth step 604, the fuel injector 30 may be provided on the engine 10 disposed within the rocker base 14 and configured to provide atomized fuel to the cylinder. The fuel injector adapter 40 may then be installed within the fuel injector 30. In a fifth step 605, the adapter shaft 410 is assembled, which may include providing the first pair of O-rings 425, 426 about annular recesses between the shoulder 414 and the first shaft end 411 proximate the first monitoring portion 424.

In a sixth step 606, the adapter shaft 410 may be attached to the fuel injector 30. In the embodiment as shown in FIGS. 4 and 7, the first shaft end 411 of the adapter shaft 410 includes a threaded portion such that the adapter shaft 410 is threaded into the fuel injector 30 until the shoulder 414 contacts the fuel injector 30. In order to maintain a stable connection, the adapter shaft 410 may be threaded into the fuel injector 30 until a specific torque rating is reached.

In a seventh step 607, the remaining of the first plurality of seals including the second pair of O-rings 429, 430 and the third pair of O-rings 431, 432 may be installed on the adapter shaft 410 within the plurality of annular recesses (418, 419, 421, 423). In an eighth step 608, the fitting portion 441 of the adapter body 440 may be disposed over the adapter shaft 410 such that the fitting portion 441 covers the first plurality of seals (429, 430, 431, 432) and forms separate portions between the adapter shaft 410 and the bore 439 of the fitting portion 441. The separate portion may include the fuel portion 438 fluidly connected to the port portion 416 of the adapter shaft 410, and may include the monitoring portion including the second monitoring portion 422 and the third monitoring portion 420 in the bore 439. The second monitoring portion 422 and the third monitoring portion 420 may be fluidly connected to the port monitoring portion 447 in the elbow port through the monitoring passage 449 and the bridge passage 450 in the extension 444. In a ninth step 609, the fastener 460 may be attached to the second shaft end 412 of the adapter shaft 410 such that the adapter body 440 is locked in position with the fuel injector 30. As with the sixth step 606, in the ninth step 609, the fastener 460 may be threaded onto the threads 413 on the second shaft end 412 and may be tightened until a specific torque rating is reached.

In a tenth step 610, the valvetrain components may be installed within the rocker base 14. The valves 20, each having the valve spring 21, the intake rocker arm 15 and the intake connector 16, the exhaust rocker arm 17 and the exhaust connector 18, the injector arm 23, and the rocker shaft 22 may be installed as depicted in FIGS. 1-2. The valvetrain components are installed over the fuel injector adapter 40 such that components of the valvetrain may be serviced by opening a rocker cover (not depicted), and may be removed, replace, and adjusted without requiring a need to disconnect fuel delivery components or lines.

In an eleventh step 611, the elbow 50 may be connected to the adapter body 440. The elbow 50 may include the elbow body 514 with the connector end 501 disposed within the elbow port 445 of the adapter body 440 and the bulkhead end 502 configured to be attached to the bulkhead 60 on the rocker base 14. The second plurality of seals 510, 511 may be disposed about the connector end 501 of the elbow 50. The connector end 501 of the elbow 50 may be disposed in the elbow port 445 of the fuel injector adapter 40 such that the second plurality of seals 510, 511 separates the connector end 501 of the elbow 50 into an elbow fuel portion 506 and an elbow monitoring portion 509. The elbow fuel portion 506 may be connected to the elbow fuel passage 504, and the elbow monitoring portion 509 may be connected to the elbow monitoring passage 507.

Finally, in a twelfth step 612 the fuel line 70 and the monitoring line 80 may be connected to the bulkhead 60. The fuel line 70 is connected to the bulkhead 60 of the rocker base 14 such that fuel may be delivered to the fuel injector 30 via the fuel passage 448. The monitoring line 80 is connected to the leak monitor 81 which may include a sensor 82 for detecting the presence of leaking fuel within the monitoring passage 449, and the collection device 83 for collecting excess fuel within the monitoring line 80.

The method 600 of assembling the engine 10 provides for a valvetrain and fuel delivery configuration fully contained within the rocker base 14 of the engine 10. This configuration provides a small footprint, requiring only a simple rocker cover, and allows for servicing of components of the valvetrain without need for disconnection of components of the fuel delivery system. As such, the configuration of the rocker base 14 of the engine 10 allows for reduced service times, longer service life, and reduced downtime. Additionally, arrangement of the monitoring portions allows for efficient monitoring of leaks within the fuel delivery system near the fuel injector 30.

The method 600 can be adapted to any internal combustion engine, and certain components are capable of retrofit onto older internal combustion engine designs. The method 600 can also be adapted to other internal combustion engines used in a wide variety of industries on many types of machines.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A fuel injector adapter for an internal combustion engine, comprising:

an adapter shaft including a first shaft end configured to be disposed within a fuel injector, a second shaft end, and a shaft passage disposed in the adapter shaft extending from the first shaft end to a port portion of the adapter shaft, the port portion including annular openings; and an adapter body disposed over the adapter shaft, including a fitting portion including a first end, a second end, and a bore including a fuel portion, an elbow port spaced from the fitting portion, the elbow port including a port fuel portion, and an extension connecting the fitting portion to the elbow port, the extension including a fuel passage connecting the port fuel portion of the elbow port to the fuel portion of the bore proximate the annular openings of the port portion of the adapter shaft.

2. The fuel injector adapter of claim 1, wherein the adapter shaft further comprises:

a plurality of annular recesses on an outside surface of the adapter shaft; and a first plurality of seals disposed within the plurality of annular recesses of the adapter shaft.

3. The fuel injector adapter of claim 2, wherein spacing of the first plurality of seals on the adapter shaft separates the bore to further include a monitoring portion when the adapter body is disposed over the adapter shaft, the elbow port including a port monitoring portion, and the extension including a monitoring passage connecting the port monitoring portion to the monitoring portion.

4. The fuel injector adapter of claim 3, further comprising an elbow connecting the fuel injector adapter to a bulkhead of a rocker base, the elbow comprising:

an elbow body including a connector end disposed within the elbow port of the fuel injector adapter, and a bulkhead end attached to the bulkhead;

an elbow fuel passage within the elbow body extending from the connector end to the bulkhead end and aligning with a bulkhead fuel passage in the bulkhead;

an elbow monitoring passage within the elbow body extending from the connector end to the bulkhead end and aligning with a bulkhead monitoring passage in the bulkhead; and a second plurality of seals disposed about the connector end such that the elbow fuel passage and the elbow monitoring passage are fluidly separated at the connector end when the elbow is inserted into the elbow port.

5. The fuel injector adapter of claim 3, wherein the monitoring portion further includes a first monitoring portion proximate the first shaft end of the adapter shaft when it is disposed within the fuel injector, the first plurality of seals including a first pair of O-rings defining a boundary of the first monitoring portion, and a second monitoring portion between the first shaft end and the port portion of the adapter shaft, the first plurality of seals including a second pair of O-rings defining a boundary of the second monitoring portion.

6. The fuel injector adapter of claim 1, further comprising a fastener disposed on the second shaft end configured to lock the adapter body in an abutting position with the fuel injector.

7. A method of assembling an internal combustion engine, comprising:

providing a fuel injector disposed in a rocker base on the internal combustion engine;

attaching an adapter shaft of a fuel injector adapter to the fuel injector, the adapter shaft including a first shaft end disposed within the fuel injector, a second shaft end, a shaft passage disposed in the adapter shaft extending from the first shaft end to a port portion of the adapter shaft;

disposing a fitting portion of an adapter body about the adapter shaft, the adapter body including the fitting portion with a first end and a second end, a bore including a fuel portion, an elbow port including a port fuel portion; and an extension connecting the fitting portion to the elbow port including a fuel passage connecting the port fuel portion of the elbow port to the fuel portion of the bore proximate the port portion of the adapter shaft;

connecting an elbow to the adapter body, the elbow including an elbow body with a connector end disposed within the elbow port of the adapter body and a bulkhead end attached to a bulkhead on the rocker base.

8. The method of claim 7, wherein attaching the adapter shaft to the fuel injector further comprises:

disposing a first plurality of seals about a plurality of annular recesses of the adapter shaft;

inserting the adapter shaft at the first shaft end into the fuel injector; and disposing the fitting portion of the adapter body over the adapter shaft such that the fitting portion covers the first plurality of seals and forms separate portions between the adapter shaft and the bore of the fitting portion including the fuel portion fluidly connected to the port portion of the adapter shaft, and a monitoring portion in the bore, the monitoring portion being fluidly connected to a port monitoring portion in the elbow port through a monitoring passage in the extension connecting the monitoring portion to the port monitoring portion.

9. The method of claim 8, wherein connecting the elbow to the fuel injector adapter further comprises:

disposing a second plurality of seals about the connector end of the elbow; and disposing the connector end of the elbow in the elbow port of the fuel injector adapter such that the second plurality of seals separates the connector end of the elbow into an elbow fuel portion and an elbow monitoring portion, the elbow fuel portion connected to the fuel passage, and the elbow monitoring portion connected to the monitoring passage.

10. The method of claim 7, further comprising attaching a fastener at the second shaft end of the adapter shaft abutting with the adapter body.

11. The method of claim 7, further comprising connecting the bulkhead of the rocker base to a fuel line such that fuel may be delivered to the fuel injector via the fuel passage.

12. The method of claim 9, further comprising connecting the bulkhead of the rocker base to a monitoring line including a sensor, the monitoring line connected to the monitoring passage and configured to monitor a leak condition.

13. The method of claim 12, wherein monitoring the leak condition further comprises pumping pressurized fluid into the monitoring passage and detecting atomized fuel with the sensor.

14. An internal combustion engine, comprising:

a rocker base;

a fuel injector attached to the rocker base;

a fuel injector adapter connected to the fuel injector, further comprising:

an adapter shaft including a first shaft end disposed within the fuel injector, a second shaft end, a shaft passage disposed in the adapter shaft extending from the first shaft end to a port portion of the adapter shaft, the port portion including annular openings, and an adapter body disposed over the adapter shaft, including a fitting portion including a first end, a second end, and a bore including a fuel portion and a monitoring portion, an elbow port spaced from the fitting portion, the elbow port including a port fuel portion and a port monitoring portion, and an extension connecting the fitting portion to the elbow port, the extension including a fuel passage connecting the port fuel portion of the elbow port to the fuel portion of the bore proximate the annular openings of the port portion of the adapter shaft, and the extension including a monitoring passage connecting the port monitoring portion of the elbow port to the monitoring portion of the bore, and an elbow connecting the fuel injector to the rocker base.

15. The internal combustion engine of claim 14, the elbow further comprising:

an elbow body including a connector end disposed within the elbow port of the fuel injector adapter, and a bulkhead end attached to a bulkhead of the rocker base;

an elbow fuel passage within the elbow body extending from an elbow fuel portion at the connector end aligned with the port fuel portion of the adapter body to an elbow fuel inlet portion at the bulkhead end aligned with a bulkhead fuel passage in the bulkhead; and an elbow monitoring passage within the elbow body extending an elbow monitoring portion at the connector end aligned with the port monitoring portion of the adapter body to an elbow inlet monitoring portion at the bulkhead end aligned with a bulkhead monitoring passage in the bulkhead.

16. The internal combustion engine of claim 15, further comprising a fuel line connected to the bulkhead fuel passage at an outside surface of the rocker base.

17. The internal combustion engine of claim 15, further comprising a leak monitor connected to the bulkhead monitoring passage at an outside surface of the rocker base.

18. The internal combustion engine of claim 17, wherein the leak monitor includes a sensor, the leak monitor providing pressurized air to the monitoring passage and detecting atomized fuel with the sensor.

19. The internal combustion engine of claim 17, wherein the leak monitor includes a pressure sensor, the leak monitor providing gaseous nitrogen into the monitoring passage and detecting an increase in pressure.

20. The internal combustion engine of claim 17, wherein the leak monitor includes a collection device connected to the monitoring passage for collecting an excess of leaking fuel.

* * * * *